V. HORNE.
Check-Rower.
No. 161,232. Patented March 23, 1875.
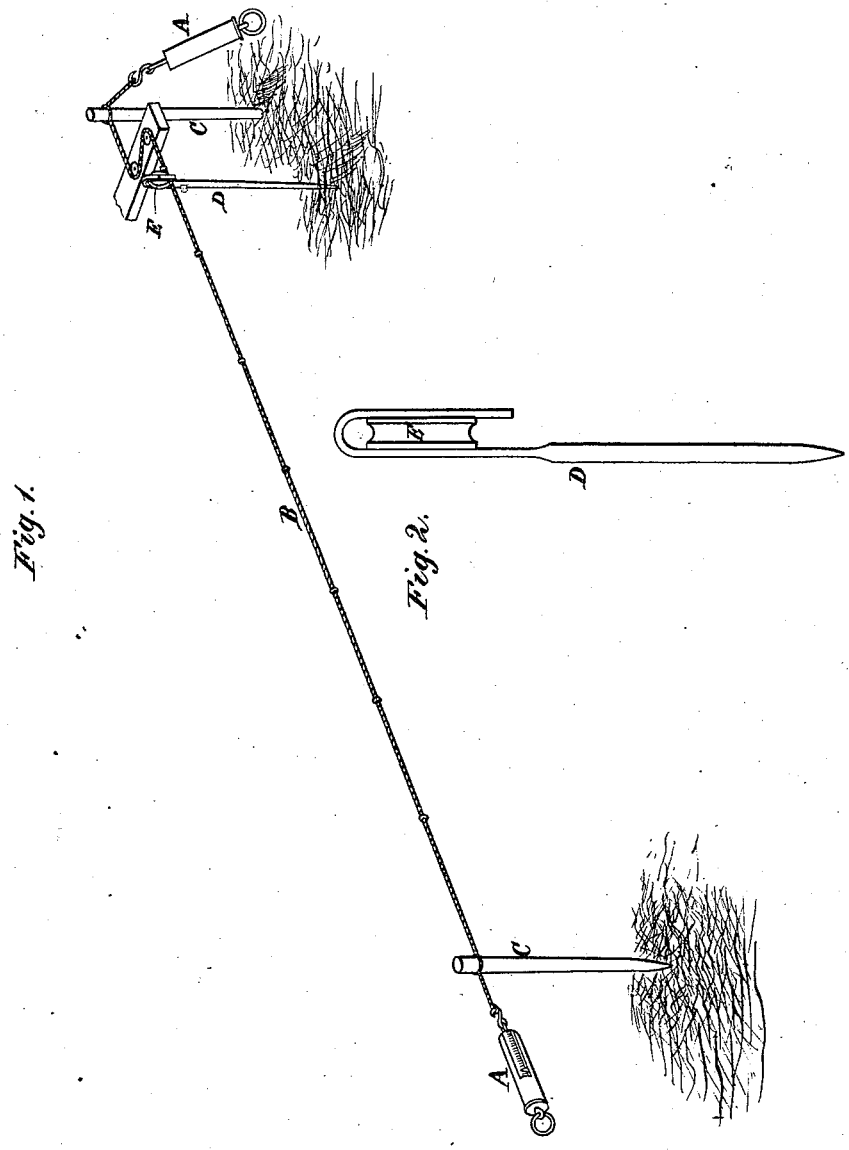
WITNESSES
Henry N. Miller
C. L. Emith
INVENTOR
Valentine Horne
By
per — Alexander T. Mason
Attorney

UNITED STATES PATENT OFFICE.

VALENTINE HORNE, OF ATLANTA, ILLINOIS.

IMPROVEMENT IN CHECK-ROWERS.

Specification forming part of Letters Patent No. 161,232, dated March 23, 1875; application filed January 25, 1875.

*To all whom it may concern:*

Be it known that I, VALENTINE HORNE, of Atlanta, in the county of Logan and in the State of Illinois, have invented certain new and useful Improvements in Check-Rowers; and do hereby declare that the following is a full, clear, and exact description thereof, reference being had to the accompanying drawings, and to the letters of reference marked thereon, making a part of this specification.

My invention relates to that class of check-rowers in which a knotted rope or its equivalent is used to operate the planter by being stretched across the field; and the nature of my invention consists in the application to such rope of a scale at each end to regulate the amount of force to be applied in tightening the rope. My invention also consists in combining a pulley with the ordinary forked stake used to hold the rope in place while the planter is being reversed, all as hereinafter more fully set forth.

In the annexed drawing, Figure 1 is a perspective view, showing the application of the first part of my invention. Fig. 2 is a side view of the forked stake with pulley.

In the use of the common check-rower it requires a good deal of judgment as to the amount of force to be applied in tightening the rope, and, as many persons using it lack the necessary judgment as to the amount of force to be applied in case of ravines in the field, or in case of irregular tracts of ground to be planted, the common result is irregular rows one way of the field.

This defect I have successfully overcome by the simple use of two ordinary spring-scales, A A, to be used at the ends of the rope B, so that, when stretching the rope tight across the field, the operator may know just how much power he is applying each time, and the scales will enable him to do so.

For instance, the rope B is fastened at one end, and the operator is at the other end with his planter, ready to take a new trip across. The scale is tied to the end of the rope, and the stake C is tied to the rope a short distance ahead of the scale. The rope is now drawn back with the hand holding the scale till a certain number of pounds of force is applied—say, thirty or forty pounds—and, while held at this point, the stake held in the other hand is pushed down into the ground, thereby holding the rope in its place. The scales and end of the rope are then dropped on the ground, and the operator goes on to the other end in the usual way of planting, and, when there, applies just the same number of pounds of force in tightening the rope that he applied at the other end, and in the same way, and so on, through the job.

The hills will then correspond exactly, and the rows will be regular both ways of the field.

D represents the forked or bent iron stake commonly used to hold the rope in place while the driver is reversing the planter. In this stake I apply a grooved pulley, E, as shown, to prevent the iron stake from wearing out the rope, as is rapidly done in the old stake used.

When the planter arrives at the end of the field, near the fixed end of the rope, the driver steps off the planter and goes to the rear thereof, when he presses the iron stake into the ground, so that the fork will clasp one of the knots in the rope and hold the rope in position and prevent it slacking while the planter is turned around for the purpose of going in the opposite direction. When all is ready for a return across the field, the driver takes hold of the scales on that end of the rope and draws so many pounds on it, the same power being applied on each end at each time when the rope is stretched, and when the slack is taken up by the application of so many pounds of power and the knot is drawn away from the forked iron stake, however little, so that just as much power is exerted on the opposite stake C across the field, the stake C in the hand of the driver is forced into the ground to hold that end of the rope. Then the forked iron stake, with the pulley attached, is drawn out of the ground and taken across the field to be used again on that end for the same purpose.

Having thus fully described my invention, what I claim as new and desire to secure by Letters Patent, is—

1. The combination, in a check-rower, of the knotted rope B, or its equivalent, scales A A, and stakes C C, substantially as and for the purposes herein set forth.

2. The combination, in a check-rower, of the knotted rope B, or its equivalent, scales A A, stakes C C, and the forked iron stake D, with pulley E, substantially as and for the purposes herein set forth.

In testimony that I claim the foregoing I have hereunto set my hand this 22d day of December, 1874.

VALENTINE HORNE.

Witnesses:
   THOS. SLADE,
   L. H. KERRICK.